FREQUENCY OR ANGLE

FREQUENCY OR ANGLE

INVENTOR:
PAUL W. HOWELLS,
BY Delbert P. Warner
HIS ATTORNEY.

INVENTOR:
PAUL W. HOWELLS,
BY Delbert P. Warner
HIS ATTORNEY.

April 21, 1970 P. W. HOWELLS 3,508,262
RADAR SYSTEM
Filed Jan. 9, 1962 3 Sheets-Sheet 3
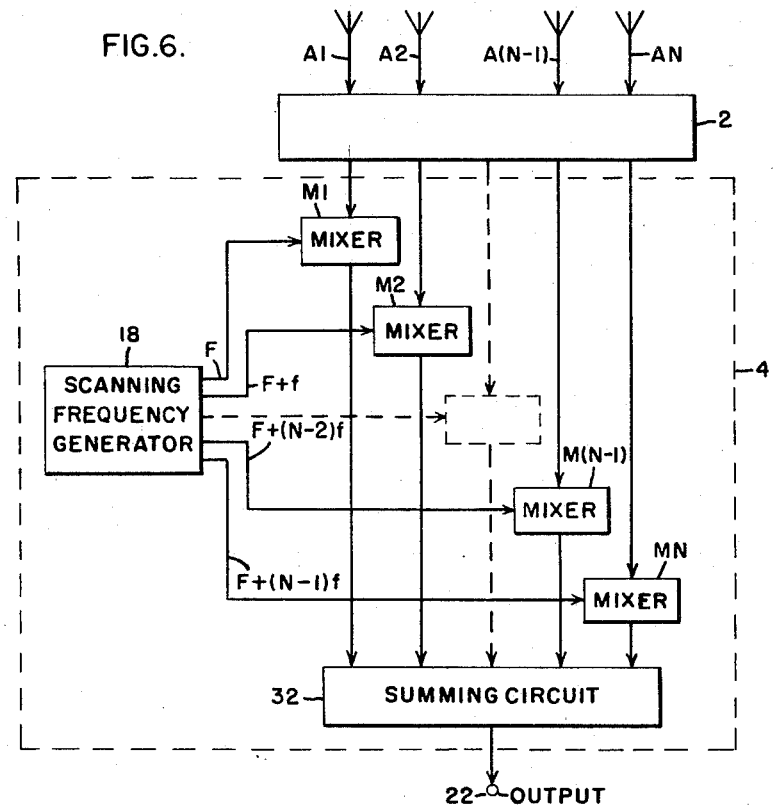
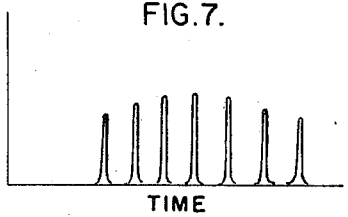
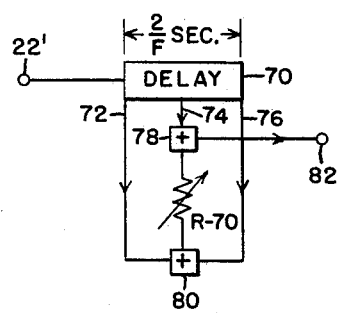
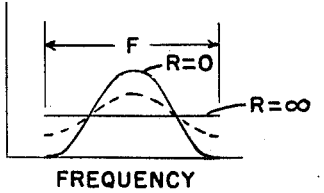
INVENTOR:
PAUL W. HOWELLS,
BY Delbert P. Warner
HIS ATTORNEY.

3,508,262
RADAR SYSTEM
Paul W. Howells, Morrisville, N.Y., assignor to General Electric Company, a corporation of New York
Filed Jan. 9, 1962, Ser. No. 166,735
Int. Cl. G01s 7/28
U.S. Cl. 343—17.1                                10 Claims This invention relates to the improvement of electronic circuits and in particular to the improvement of the data handling characteristics of electronic circuits which function as components of radar systems.

Some of the prior art devices of interest have been developed to distinguish between, and separate, noise from signals of known frequency and known modulation which have undergone unknown phase shifts due to Doppler effect. Others have been developed to control or shape the beams formed by radar antennas. Each of these types of prior art devices uses matched filters and cross-correlation devices to detect and separate the desired signals from noise or other undesired signals. One of the prior art techniques shows the equivalent of a bank of matched filters, spread throughout the Doppler spectrum, which is followed by a rapidly scanning sampling switch. In effect, such systems simultaneously integrate the target returns from all possible Doppler frequencies, coming from all ranges, to provide range and velocity information about each of a plurality of targets. Examples of this prior art may be found in co-pending applications and patents which have been assigned to the same assignee as is the instant invention. Examples are a patent to Sidney Applebaum entitled "Spectrum Analyzer," Patent No. 2,997,650 issued Aug. 22, 1961 and a patent application by Sidney Applebaum entitled "Frequency Scanning Filter Arrangement," Ser. No. 708,733, now Patent No. 3,026,475, which was filed on Jan. 13, 1958, and assigned to the same assignee as the present invention. Another one of these prior art techniques embodies an adaptation of the same principles for beam forming; but, the independent variable is the scanning angle, rather than frequency.

Coupled to the output circuits of the foregoing devices have been automatic gating circuits, such as that disclosed in a co-pending application assigned to the assignee of the present invention by Paul W. Howells et al. Ser. No. 106,972, filed May 1, 1961, now Patent No. 3,155,912, and entitled "Automatic Gating Circuit." An automatic gating circuit, when coupled to the preceding circuits, makes it possible to distinguish information in such a way as to better reject returns from extended range targets, such as chaff corridors, ground clutter and weather and to permit the passage of desired target signals.

The prior art devices, as defined in the patents and applications referred to, have proven to be very useful in separating desired signals from undesired signals; however, they do not function as well as desired at all times, particularly with respect to their resolution of output signals.

It is a primary object of this invention, therefore, to provide means for improving the resolution of signals derived by radar circuitry.

It is another object of this invention to provide means for improving the signal-to-noise ratio of signals derived by radar.

It is a further object of this invention to weight the amplitude of signals put out by radar receiver circuits in order to de-emphasize certain undesired signals.

It is still another object of this invention to provide for optimum performance of a radar filtering circuit in a noisy environment.

The foregoing objects and others ancillary thereto may be accomplished by coupling signal processing apparatus to suitable input circuits and to selected weighting filters. The input circuits provide signals from radar receiver sources at intermediate frequencies with the signals arranged either serially or in parallel depending on the demands of the signal processing apparatus. The signal processing apparatus takes the IF signals and by a process of filtering and summing, or integrating, devises a plurality of phase coherent signals. These phase coherent signals are then weighted in a weighting filter to enhance certain desired characteristics and dispose of certain unwanted signals.

The novel features that I consider characteristic of my invention are set forth with particularity in the appended claims. The invention itself, however, both as to its organization and its method of operation, together with additional objects and advantages thereof, will best be understood from the following description of a specific embodiment when read in connection with the accompanying drawings, in which:

FIGS. 4, 5 and 6 show particular embodiments of the processor which may be employed in the circuit of FIG. 1;

FIG. 7 illustrates a plurality of pulses such as are used as input signals into the processors of FIG. 4 and FIG. 5;

FIG. 8 shows a diagram of a weighting filter such as may be used in the present invention; and FIG. 9 is a graphical representation of the weighting filter response characteristics.

Figure 1:
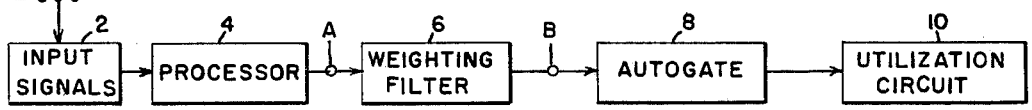
FIG. 1 is a block diagram which illustrates an embodiment of the invention.

Turning now to FIG. 1, there is illustrated a block diagram of a portion of a radar circuit embodying the invention. This circuit includes a block 2, coupled to an antenna array A1, A2 . . . A$n$, which is labeled "input signal" and represents the source of IF or intermediate frequency signals which originate from signals reflected back from targets of interest to a radar operator as well as reflections from fixed objects or from chaff, and may include jamming signals transmitted from an unfriendly source. Block 2 will be understood to include receiver circuits and to provide output signals at the IF or intermediate frequencies as well as including antenna scanning equipment. Block 4, which is labeled Processor and is shown connected to input signal block 2, may include a Velocity Indicating Coherent Integrator or VICI which is designed to distinguish signals originating at rapidly moving targets from signals originating at all other sources, such as those from fixed objects and signals from moving objects of extended range such as weather and chaff. The signals from VICI thus represent moving targets and these signals are supplied at point A in FIG. 1 and to the weighting filter indicated by block 6. The processor 4 may incorporate other embodiments of the invention employing similar principles to those used with VICI, but descriptions of other embodiments will be delayed until a discussion of VICI has been completed in order to avoid confusion.

Figure 2:
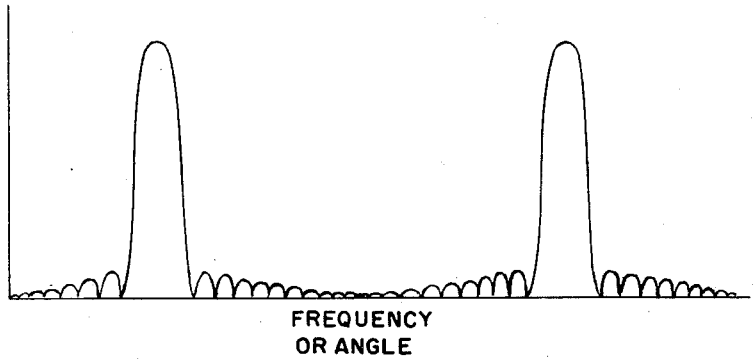
FIGS. 2 and 3 illustrate waveforms characteristic of those signals which appear at points A and B in FIG. 1.

The operation of VICI has been explained in considerable detail in the patent and co-pending application now a patent of Sidney Applebaum which have been referred to previously and a brief description will be found later in this application when further reference is made to FIGS. 4 and 5. For immediate purposes, it may be said that VICI distinguishes those signals which show the effects of Doppler shift from signals in which little or no Doppler effect is present. As a consequence of this discrimination, the signals transmitted by VICI indicate the velocity of a moving target and will appear as output signals at a point such as A in FIG. 1. The pulses appearing at A are generally of a kind shown in FIG. 2, where the abscissa is frequency, consisting of large central pulses attended by a number of small sidelobes. The velocity resolving capability of VICI is dependent upon the shape of its output waveform. The sidelobes shown in FIG. 2 are not particularly prominent, but these sidelobes do tend to mask weaker targets which may be moving at velocities outside the main peak and consequently tend to reduce the velocity resolving capabilities of VICI.

Figure 3:
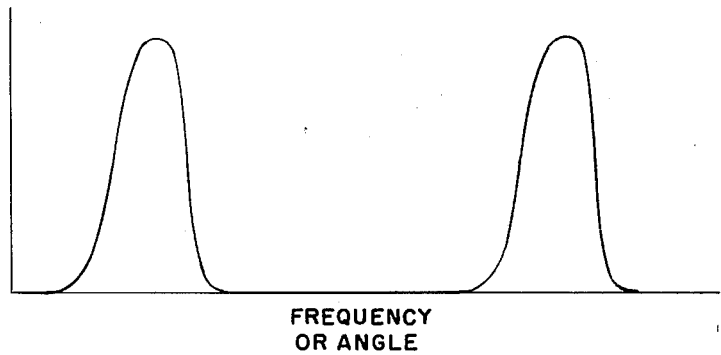

In order to provide an improvement in the velocity resolving capability of VICI, a weighting filter such as that which would be included in block 6 of FIG. 1 is introduced into the circuit following VICI. The filter in block 6 would characteristically be a weighting filter which is quite flexible and very practical for reducing the sidelobes illustrated in FIG. 2 and thus for preventing masking of the velocities of the weaker targets. The output of such a weighting filter, corresponding to the curves in FIG. 3, where the abscissa is again frequency, could be supplied as an output at a point such as B of FIG. 1. The main peaks of the pulses in FIG. 3 are slightly wider than the corresponding main peaks of the pulses in FIG. 2, but the sidelobes have been reduced effectively to zero, and will no longer operate to mask the weaker targets.

Having eliminated the undesirable sidelobes by use of the weighting filter 6, the principal pulses may then be supplied to other portions of the circuit to give improved performance thereof. For example, they may be supplied to the auto gate indicated in block 8 which has been described in considerable detail in the previously referred to application of Paul W. Howells et al., now Patent No. 3,155,912. The auto gate, as indicated in the Howells et al. patent, is an automatic gating device which eliminates certain signals which are undesired, but which have been transmitted by VICI or other circuitry to terminal B. The remaining signals then are supplied to various utilization circuits, indicated by block 10 of FIG. 1 which may include such things as plan position indicators, range-height indicators and the like.

Figure 4:
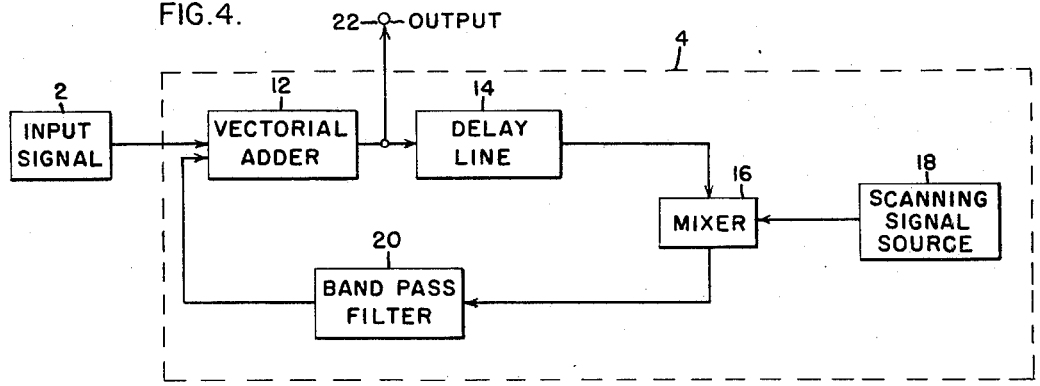

Turning now to a more detailed consideration of the operation of VICI, which should be helpful in the understanding of the operation of the present invention, we will consider a block diagram in FIG. 4 of a particular embodiment of a VICI circuit, such as is shown in the previously referred to patent of Sidney Applebaum, Pat. No. 2,997,650. In FIG. 4, a signal is supplied from a block labeled 2, where the block represents connections to the receiving antennas, the amplifiers, local oscillators and other circuits common to radar receiver circuits so that the signal supplied by the input signal device 2 will, in fact, be what is commonly termed an IF signal. This signal will consist of a number of pulses having various phase relationships, part of which will be proportional to the pulse repetition frequency generated by the radar transmitter and part of which will exhibit a varying pulse repetition frequency where the variations are due to shifts in frequency caused by the Doppler effect. These signals will be supplied from the block 2 to the VICI circuit in block 4, where blocks 2 and 4 designate the same apparatus in FIG. 1 and in FIG. 4.

Before undertaking a detailed description of the operation of FIG. 4, it will be well to consider some factors which are significant in the reception of radar signals. In the first place, radar signals when received from stationary objects are reflections of the original pulses transmitted by the radar transmitter and consequently the majority of them can be expected to be spaced apart at a fixed pulse repetition frequency determined by the transmitter. In attempting to get a radar "fix" on such stationary objects, it is possible to utilize this phenomenon of fixed repetition rate to provide a separation of noise from intelligence signals. This can be done by providing the input signals to a delay circuit which contains a plurality of taps each of which is spaced from the succeeding one by an increment of time determined by the pulse repetition rate, so that once the delay device has been filled-up the pulses occurring at these intervals may be summed or integrated to provide a pulse of much greater amplitude, which may then be more readily distinguished from noise signals.

It will be appreciated that random noise signals will not be increased to the same degree when they are integrated by action of the delay line and summing circuits, since the noise signals will not occur at a constant repetition rate and consequently each pulse due to noise will not be added to the other pulses in the integration process but, on the contrary, some pulses will actually be subtracted from others.

It is apparent from the preceding paragraph that a delay line and summing technique can be very effective to separate noise and intelligence signals where the intelligence signals are spaced apart by a constant amount determined by the pulse repetition frequency of the transmitter. However, if these pulses have their spacing modified by Doppler shift it is equally apparent that the spacing between pulses will change from one space to the next by equal increments when the object and the radar equipment have a constant linear velocity with respect to each other. If such a signal is run through a conventional delay line, or through a recirculating circuit in which a constant amount of delay is inserted by a delay line before each succeeding pulse is added to that already circulating, it is apparent that the pulses will not be made available so that they can be added in phase.

One way to overcome the problem of adding signals of constantly shifting phase relationships is to employ a recirculating circuit such as that illustrated in FIG. 4 in which the input signal is supplied to a vectorial adder 12 and from there to a delay line 14, which will introduce a delay proportional to the pulse repetition frequency. From the delay line the pulses will be transmitted to a mixer 16 to be mixed with a scanning signal from a scanning signal source 18 which causes a shift in frequency of the output of mixer 16 which will periodically bring it in phase with the next pulse from the input signal source 2. In a preferred embodiment of this circuit a bandpass filter 20 is supplied so that signals outside a certain frequency band, which result from at least 19 recirculations of the input signal in the preferred embodiment, will not be transmitted. The output signal appearing at terminal 22 from this circuit will correspond to that appearing at A in FIG. 1 and will be of the general form illustrated by the pulses of FIG. 2, where the abscissa is frequency.

Figure 5:
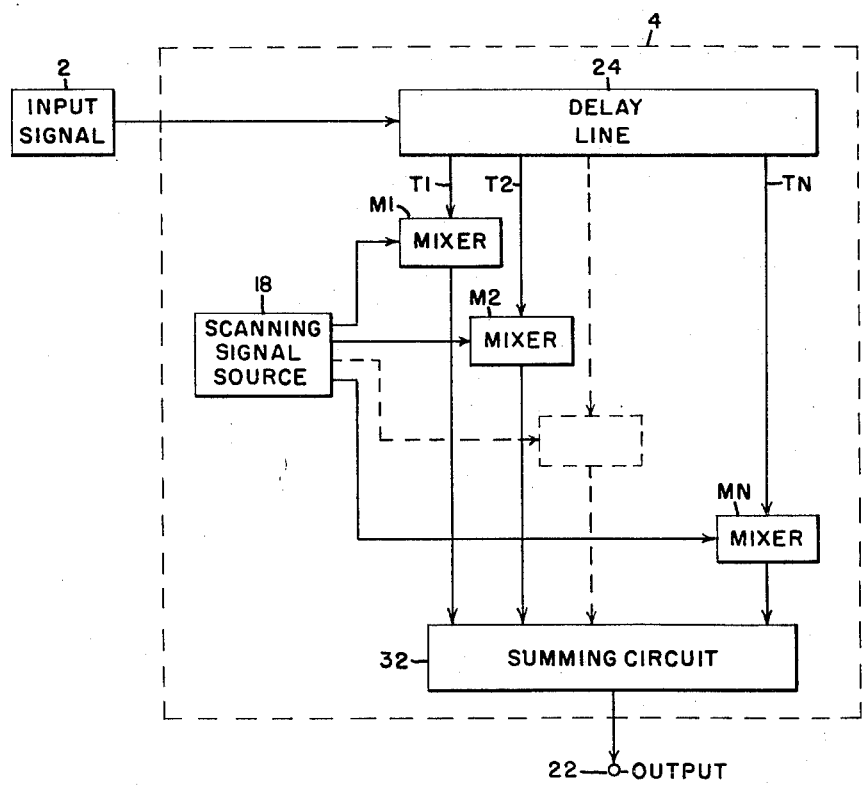

Another embodiment of VICI, shown in FIG. 5, corresponds to the VICI circuit illustrated in the co-pending U.S. application of Sidney Applebaum, previously identified as application Ser. No. 708,733, now Patent No. 3,026,475. In this embodiment of VICI, the input signal from the block 2 is supplied to a delay line 24 having a plurality of taps designated as T1, T2, . . . TN where N in a preferred embodiment is 19. The taps on delay line 24 are equally spaced apart, consequently the direct addition of signals from them will not encompass signals exhibiting the effects of Doppler shift. Therefore, the outputs appearing on the taps of the delay line are supplied to mixer circuits M1, M2 . . . MN which are supplied with signals from a scanning signal source 18 which provides the necessary changes in frequencies of the pulses from delay line 24 so that they may be added together with correct phase relationships by a summing circuit 32 which can provide an output to terminal 22 in a desired form, such as that shown in FIG. 2.

Whenever an embodiment of VICI is employed, as represented by processor 4 of FIGS. 1, 4, 5 and 6, the change made in the signals by VICI can be considered as a conversion of input signals in the time domain to output signals in the frequency domain. That is, a plurality of pulses separated in time by varying increments, as shown in FIG. 7, are combined by VICI into a waveform such as that shown in FIG. 2, where the measurement along the abscissa, or the axis of the independent variable, is Frequency instead of Time.

Another embodiment of the processor 4 of FIGURE 1 is shown in FIGURE 6 which illustrates an antenna beam former. In the processors shown in FIGURE 4 and FIGURE 5 the input signals supplied were in series and came through a single terminal. In FIGURE 6 the input signals are provided from a number of separate antenna elements A1, A2 . . . AN so that the inputs from block 2 are essentially in parallel without processing through a delay line as was done in FIGURE 5. These inputs are then modulation scanned by mixing in mixers M1, M2 . . . MN with a series of signals from the scanning local oscillators in the scanning frequency generator at 18 which provide signals at frequencies separated by a scanning frequency "f," as indicated. The outputs of the mixers are supplied to the summing circuit 32 and thence to the output terminal 22, where terminal 22 corresponds to terminal B in FIGURE 1. The circuit of FIGURE 6 serves to control the beam, or the pattern of sensitivity, of the antenna array A1, A2 . . . AN. As a result of the operation of the circuit of FIGURE 6, the beam formed by the antenna may be of the shape shown in FIGURE 2 where the abscissa is plotted as angle instead of frequency. This being so, the circuit of FIGURE 1 following terminal A will have the same broadening effect on the signal from FIG. 6 that it had on signals from the processors shown in FIG. 4 and FIG. 5 and the signal at terminal B will correspond to that shown in FIG. 3, where it is understood that the abscissa is now a plot of angle instead of frequency.

It will be apparent from the foregoing that the circuit of FIGURE 1 has the effect of reducing certain disturbing signals which under some circumstances attend large signals. When the processor 4 of FIGURE 1 is of a kind shown in FIG. 4 or FIG. 5 this large signal is a function of frequency and when the processor is of the kind shown in FIG. 6 the large signal is a function of angle. In each case the equipment following the processor may be much the same, as indicated in FIGURE 1, though the ultimate meaning and use of the signals may differ.

The signal in FIG. 2 may be applied to a weighting filter, such as that shown in FIG. 8, where the input terminal 22' will be connected to the output terminal 22 of FIGS. 4, 5, or 6. The input signal is applied from 22' to the delay line 70 and from there through taps 72, 74 and 76 to adding circuits at 78 and 80 as shown in FIG. 8. The signals from taps 72 and 76 are added together and the resulting signal is transmitted through resistor R-70 to be combined with the signal from tap 74 in the adder at 78 to provide an output signal at terminal 82. As indicated in the figure, the delay between taps 72 and 76 is made equal to 2/F sec., where F is the band width of the signals emerging from summing point 22 in FIG. 4, FIG. 5, and FIG. 6.

FIG. 9 is a series of graphs representing the weighting filter response. It will be seen that large changes in the weighting filter response characteristics can be made by varying the value of the resistance of the filter R-70 in the example shown in FIG. 8.

The weighting filter illustrated in FIG. 8 is a transverse filter with a summing network which is controllable by varying the rheostat R-70. In a preferred embodiment, the filter characteristic can be varied from a flat characteristic producing a −13 db attenuation of sidelobes to a cosine squared characteristic producing a −34 db attenuation of sidelobes. Phase response will remain linear at all settings of R-70 and peak output will remain constant. It will be apparent to those skilled in the art that more complex weighting functions may be produced by using more taps on the delay line.

Certain considerations should be kept in mind in using a particular filter. For example, a requirement of a weighting filter for optimum performance in noise is that the weighting should match the signal amplitude, which is usually determined by the antenna pattern. Also, the frequency resolution of the filter is the Fourier transform of the amplitude weighting used. Constant weight will produce a sin $x/x$ response, gaussian weights a gaussian response, and so on.

What I claim and desire to secure by Letters Patent of the United States is:

1. In an electronic circuit for deriving information from radar signals of known phase relationships, means for receiving said signals, means for adjusting the relative frequencies of said signals to change their phase relationships and for summing the resulting signals to provide coherent signals, means for weighting said coherent signals to provide improved signals, and means for using said improved signals.

2. In an electronic circuit for deriving information from radar signals, means for receiving said signals, means for deriving IF signals from said signals, means for shifting the phase of said IF signals and for summing said shifted IF signals to provide coherent signals, means for weighting said coherent signals to provide improved signals, and means for using said improved signals.

3. In an electronic circuit for deriving velocity information from radar signals displaying Doppler shift, means for receiving said signals displaying Doppler shift and for filtering and integrating said signals to provide coherent signals, means for weighting said coherent signals to provide improved signals, and means for using said improved signals to provide indications of velocity.

4. An electronic circuit for processing a signal having components displaying frequency shifts indicative of Doppler effect comprising means for filtering and integrating said signal to provide coherent signals derived from said components displaying frequency shifts and means for receiving said coherent signals and weighting them to provide output signals of improved characteristics.

5. An electronic circuit for improving the characteristics of a wave form by processing a signal having components displaying frequency shifts indicative of Doppler effect, means for filtering and integrating said signal to provide coherent signals derived from said components displaying frequency shifts and means for receiving said coherent signals and weighting them to provide output signals of improved characteristics.

6. In an electronic circuit for deriving velocity information from radar signals, means for receiving said signals, means for deriving from said received signals a group of IF signals representing reflections from a given target, means for adjusting the frequency relationships of the IF signals of said group and for summing the signals of said group to provide coherent signals, means for weighting said coherent signals to provide improved signals, and means for using said improved signals.

7. An electronic circuit for improving the signal to noise ratio of received signals comprising a circuit for receiving a plurality of signals of known modulation but of unknown Doppler shift, means coupled to said circuit for adjusting the phase of certain of the signals of said plurality with respect to others thereof and then integrating said signals to provide a plurality of coherent output signals, and filter means for receiving said coherent output signals and weighting them to provide new output signals having improved resolution.

8. An electronic circuit for improving the signal-to-noise ratio of received signals comprising a circuit for receiving a plurality of signals of known modulation but of unknown Doppler shift, means coupled to said circuit for adjusting the phase of and integrating said signals to provide a plurality of coherent output signals, filter means for receiving said coherent output signals and weighting them to provide new output signals having improved resolution, and means for receiving said new output signals and supplying them as signals suitable for use in operating selected visual indicators.

9. An electronic circuit for improving the signal-to-noise ratio of received signals comprising means for receiving a plurality of signals of known modulation but of unknown phase relationship, means for filtering and integrating said signals to provide a plurality of coherent output signals, filter means for receiving said coherent output signals and weighting them to provide new output signals having desired characteristics, and means for receiving said new output signals and supplying them as signals suitable for use in operating selected visual indicators.

10. An electronic circuit for improving the signal to noise ratio of received signals comprising a first circuit for receiving a plurality of signals of known modulation but of unknown phase relationships, said first circuit including means for adjusting said phase relationships and then integrating said signals to provide a plurality of coherent output signals, filter means for receiving said coherent output signals and weighting them to provide new output signals having improved characteristics, and means for receiving said new output signals and utilizing them to give improved indications of range and velocity.

References Cited

UNITED STATES PATENTS

| 2,842,761 | 7/1958 | Downs | 343—7.7 |
|---|---|---|---|
| 2,487,995 | 11/1949 | Tucker | 343—17.1 |
| 2,841,704 | 7/1958 | Sunstein | 343—17.1 |

RODNEY D. BENNETT, Primary Examiner

M. F. HUBLER, Assistant Examiner

U.S. Cl. X.R.

343—7.7

PO-1050
(5/69)

UNITED STATES PATENT OFFICE
CERTIFICATE OF CORRECTION

Patent No. 3,508,262     Dated April 21, 1970

Inventor(s) Paul W. Howells

It is certified that error appears in the above-identified patent and that said Letters Patent are hereby corrected as shown below:

Column 6, line 4, change "known" to -- unknown --; line 64, after "phase" insert -- relationships --.

SIGNED AND
SEALED
AUG 11 1970

(SEAL)
Attest:

Edward M. Fletcher, Jr.
Attesting Officer

WILLIAM E. SCHUYLER, JR.
Commissioner of Patents